United States Patent [19]

Toyonishi et al.

[11] Patent Number: 5,019,609
[45] Date of Patent: May 28, 1991

[54] FILMS EASILY SOLUBLE IN COLD WATER

[75] Inventors: Shigekazu Toyonishi; Takashi Nakajima, both of Sakai, Japan

[73] Assignee: Aicello Chemical Co., Ltd., Aichi, Japan

[21] Appl. No.: 522,050

[22] Filed: May 11, 1990

Related U.S. Application Data

[63] Continuation-in-part of Ser. No. 227,293, Aug. 2, 1988.

[51] Int. Cl.$^5$ ................................................. C08K 5/20
[52] U.S. Cl. ........................................ 524/35; 524/53; 524/224; 524/247; 524/387; 524/388; 524/503; 525/56; 525/62; 526/330
[58] Field of Search .................. 524/35, 53, 224, 247, 524/387, 388, 503; 525/56, 62; 526/330

[56] References Cited

U.S. PATENT DOCUMENTS 2,611,754  9/1952  Rudoff.
2,909,502  10/1959  Matsumoto et al..

FOREIGN PATENT DOCUMENTS 306485  9/1952  Japan.
318046  1/1956  Japan.

OTHER PUBLICATIONS

"Industry of Water Soluble Films", by Masuo Masuda; published by CMC Co. on Nov. 24, 1984, pp. 266–277.

*Primary Examiner*—Bernard Lipman
*Attorney, Agent, or Firm*—Parkhurst, Wendel & Rossi

[57] ABSTRACT

A film easily soluble in cold water includes a water-soluble copolymer composed of 2 to 40 mol % of an allyl ester moiety, 97.5 to 50 mol % of a vinyl ester moiety and 0.5 to 10 mol % of at least one member selected from the group consisting of unsaturated monocarboxylic acid, unsaturated dicarboxylic acid and anhydrides thereof, and the copolymer has a degree of saponification of not less than 65 mol %. The film is easily soluble in cold water and such solubility in cold water is not lowered even if the film comes into contact with either alkaline or acidic materials and it can suitably used as wrapping material for packages which are directly thrown into water together with packed materials. The copolymer may be used of such an allyl ester, vinyl ester and further one of unsaturated carboxylic acids.

8 Claims, No Drawings

FILMS EASILY SOLUBLE IN COLD WATER

This application is a continuation-in-part application of U.S. Pat. application Ser. No. 07/227,293, filed Aug. 2, 1988.

BACKGROUND OF THE INVENTION

The present invention relates to a film easily soluble in cold water and more specifically to a film easily soluble in cold water, which comprises a water-soluble polymer obtained by saponifying a copolymer of an allyl ester and a vinyl ester and which is suitable for, in particular preparing a package which can directly be thrown into water. Additionally, the copolymer may be used of such an allyl ester, vinyl ester and further one of unsaturated carboxylic acids.

Recently, water-soluble films have been used as packaging materials. In particular, they have been used for packaging water-soluble or water-dispersible solid materials, which are toxic to the user, which must be correctly dispensed upon employing the same, and/or which are difficult to remove from human body when they are attached thereto. Such solid materials may be mentioned, for instant, fine powdery water-soluble or water -dispersible materials such products for cleaning as detergents and bleaching agents; such agro-chemicals as herbicides, insecticides, fungicides antifungs, anticeptics, pigments and dyes. In this respect, such a fine powdery material is wrapped with a water-soluble film and then the wrapped material is in general added to water as it is without taking off film. Therefore, it is required that the film for packaging should be dissolved therein within a short period of time to thereby dissolve and disperse the fine powdery material into water. This in turn requires that the film used for wrapping the material should be easily soluble in cold water.

To date, polyvinyl alcohol (hereinafter referred to as "PVA" for simplicity) has been used as a material for forming such a water-soluble film. In this connection, the completely saponified PVA is hardly soluble in col water and, therefore, PVA partially saponified has been used for such a purpose. The partially saponified PVA is certainly easily soluble in cold water, but it undergoes additional saponification when it brings into contact with any alkaline material, which leads to the lowering of stability with time. In particular, it becomes hardly soluble in cold water with the lapse of time, for instance, 2 to 3 weeks later.

Recently, there has been proposed a method in which PVA is modified with a unsaturated carboxylic acid in order to eliminate the aforementioned disadvantage and water-soluble films prepared from such modified PVA has been put on the market. In this respect, reference is made to "Suiyosei Kobunshi No Oyo To Shijyo (The Application of Water-Soluble Polymers and the Market Therefore)", pp. 266-277, published by CMC Co.

The cold water-solubility of a film comprised of PVA modified with unsaturated carboxylic acids is no influenced even when it is brought into contact with an alkaline material. On the contrary, the solubility of the film in cold water in greatly influenced by acidic material.

SUMMARY OF THE INVENTION

Accordingly, it is an object of the present invention to provide a film easily soluble in cold water whose cold water-solubility is not impared even if it is brought into contact with either alkaline materials or acidic materials for a long period of time.

The inventors of the present invention have conducted various studies to achieve the foregoing object and as a result have found that water-soluble films composed of specific water-soluble polymers are not impaired in their solubility in cold water eve if they come in contact with an alkaline material or an acidic material for a long period of time. The present invention has been completed based on such a finding.

According to the present invention, there is provided a film easily soluble in cold water which comprises, as a film-forming material, a water-soluble copolymer whose degree of saponification is not less than 65 mol % and which is composed of 6 to 40 mol % of allyl ester moieties and of 94 to 60 mol % of vinyl ester moieties, and further comprises a plasticizer for water-soluble copolymer or/and such as a polyvinyl chloride, starches, cellulose derivatives, polyacrylic acid and alkali metal salts thereof and pigments.

Furthermore, according to the present invention, there is also provided a film easily soluble in cold water which comprises, as film-forming material, a water-soluble copolymer whose degree of saponification is not less than 65 mol % and which is composed of 2 to 40 mol % of allyl ester moieties, of 97.5 to 50 mol % of vinyl ester moieties and of 0.5 to 10 mol % of unsaturated carboxylic acids.

DETAILED EXPLANATION OF THE INVENTION

The preparation of the above-mentioned copolymer as used herein for preparing water-soluble polymer and the saponification of the same can be carried out according to any known methods disclosed in, for instance, Japanese Patent Un-examined Publication (hereunder referred to as "J.P. KOKAI") No. 53-102937.

First of all, the copolymerization of an allyl ester, a vinyl ester and an unsaturated carboxylic acid (sometimes nothing of this moiety) can be effected in the presence of a solvent such a lower alcohol as methanol and a polymerization catalyst such as 2,2'-azobisisobutyronitrile or diisopropyldicarbonateparoxide-N,N-dimethylaniline.

The content of the allyl ester moiety in the copolymer of the allyl ester and the vinyl ester ranges from 6 to 40 mol % and preferably 6 to 30 mol %. This is because, if the content thereof is less than 6 mol %, saponified products thereof are inferior in solubility in cold water and the solubility in cold water thereof is impaired when it brings into contact with either an alkaline or acidic material. On the other hand, if it is more than 40 mol %, the strength of the resultant film becomes low and whereby the film is not acceptable as a material for packaging.

The content of the allyl ester moiety in the copolymer of the allyl ester, the vinyl ester and the unsaturated carboxylic acid ranges from 2 to 40 mol %. The content of the vinyl ester and the unsaturated carboxylic acid thereof range 97.5 to 50 mol % and 0.5 to 10 mol % respectively. The degree of polymerization of the copolymer is not critical, but preferably it ranges from 200 to 3,000.

The copolymer thus prepared can be saponified by adding an acid or an alkali to an alcohol solution or an aqueous alcohol solution of the copolymer. Examples of alcohols include methanol and ethanol, and methanol is preferably used as a solvent among others. A catalyst for saponification may be used and examples thereof include such an alkali catalyst as sodium hydroxide and sodium methylate and such an acid catalyst as sulfuric acid and hydrochloric acid. The degree of saponification of the copolymer, more specifically that of allyl ester and vinyl ester components is not less than 65 mol % and preferably not less than 90 mol %. This is because, the solubility thereof in cold water becomes low if the degree of saponification is outside the foregoing range.

The saponified copolymer thus produced is heat dried in accordance with a method commonly employed and is pulverized according to need to obtain a water-soluble polymer used in preparing the film of this invention.

Examples of the allyl esters as used herein are allyl formate, allyl acetate, allyl butyrate, allyl caproate and allyl maleate. Examples of the vinyl esters used in the present invention include vinyl formate, vinyl acetate, vinyl propionate, vinyl butyrate and vinyl laurate. Inter alia, particularly preferred examples thereof are allyl acetate and vinyl acetate because they are less expensive and are easily available. Each of the allyl and vinyl ester components may be used alone or in combination of two or more of them.

The copolymer of an allyl ester with a vinyl ester used in the present invention may additionally comprise unsaturated carboxylic acids copolymerizable with the allyl ester and/or the vinyl ester such as an unsaturated monocarboxylic acid, for instance, crotonic acid and (meth)acrylic acid and esters thereof; an unsaturated dicarboxylic acid and its anhidride, for instance, maleic acid, itaconic acid and fumaric acid and anhydrides thereof.

The film easily soluble in cold water in accordance with the present invention can be obtained by utilizing the foregoing water-soluble polymer as a film-forming material. The film may be produced by any known methods such as casting and extrusion.

The thickness of the film is not critical, but preferred range thereof is 10 to 150 microns.

The film of the present invention may contain a plasticizer for the water-soluble polymer according to need. Examples of preferred plasticizers are glycerin, diethylene glycol, triethylene glycol, polyethylene glycol, polyglycerol, tetraethylene glycol, triethanolamine, 1,3-butanediol, triethanolamine acetate and ethanol acetamide.

The film easily soluble in cold water in accordance with the present invention may further comprise, for instance, water-soluble polymers such as PVA, starches, cellulose derivatives, polyacrylic acids and alkali metal salts thereof; aqueous emulsions; suspensions; or pigments such as clay and titanium oxide, if the effects of the present invention are not impaired at all.

As discussed above in detail, the film of the present invention is easily soluble in cold water and such solubility in cold water is not lowered eve if it comes into contact with either alkaline or acidic materials. Therefore, the film of this invention is suitable for wrapping water-soluble or water-dispersible solid materials, which are toxic to the user, which must be correctly dispensed upon employing the same, and which are difficult to remove from human body when they are attached thereto. Such a package can be used as it is, for example, by directly throwing it into water. The film of the present invention can suitably be used as wrapping materials for use in packaging various materials such as detergents and chemicals which are wrapped in a packaging film and the packaged materials are directly thrown into water in the wrapped state when they are used (so-called direct throwing type packaged materials).

The present invention will hereunder be explained in more detail with reference to the following non-limitative working examples and reference examples and the effects practically achieved by the present invention will also be discussed in detail below in comparison with the following Comparative Examples.

In the following examples, the terms "part(s)" and "%" mean "part(s) by weight" and "% by weight" respectively unless otherwise specified.

REFERENCE EXAMPLE 1

Synthesis of Water-Soluble Polymer

There were introduced 1,000 parts of vinyl acetate and 25 parts of allyl acetate into a flask provided with a stirring machine, a thermometer, a dropping funnel and a reflux condenser, the air in the system was replaced with $N_2$ gas and then the temperature of the system was raised to 60° C. To the system there was added 10 parts of 2,2'-azobisisobutyronitrile in 300 parts of methanol to initiate polymerization of the monomers. After the initiation of the polymerization, 225 parts of allyl acetate was dropwise added to the system at a constant rate over 5 hours and the polymerization was stopped after the lapse of additional one hour. At this stage, the content of solid material in the system was 50% and the overall yield of polymer with respect to the total amount of the monomers was thus 62%. Unreacted vinyl acetate and allyl acetate were evaporated off under a reduced pressure to obtain 45% methanol solution of the resultant copolymer. It was determined that the resultant copolymer comprised 15 mol % of allyl acetate moiety and 85 mol % of vinyl acetate moiety by quantitatively analyzing the amount of the unreacted allyl acetate and vinyl acetate.

100 Parts of the methanol solution of the copolymer was maintained at 40° C. while continuously stirring, 15 parts of 1 N methanolic caustic soda solution was added thereto and stirred sufficiently and thereafter the resulting solution was allowed to stand. After 30 minutes, the solidified polymer was pulverized with a pulverizer, washed with methanol and then dried to obtain powdery polymer.

The powdery polymer was dissolved in water and viscosity thereof was determined at 30° C. and it was found to be 8 cps at a solid content of 4%. In addition, the degree of saponification of the powder was 98 mol %.

REFERENCE EXAMPLE 2

Synthesis of Water-Soluble Polymer

There were introduced 1,000 parts of vinyl acetate and 50 parts of allyl acetate into a flask similar to that used in Reference Example 1 and the air in the system was replaced with $N_2$ gas and then the temperature of the system was raised to 60° C. To the system there was added 5 parts of 2,2'-azobisisobutyronitrile in 260 parts of methanol to initiate polymerization of the monomers. The polymerization was stopped 5 hours after the initiation of the polymerization. At this stage, the content of solid material in the system was 60%. Then, unreacted allyl acetate and vinyl acetate were forced out according in the same manner as in Example 1 to obtain 47% methanolic solution of the resultant copolymer. It was confirmed by the same quantitative analysis as in Reference Example 1 that the resultant copolymer comprised 6 mol % of allyl acetate moiety and 94 mol % of vinyl acetate moiety.

As in Reference Example 1, 100 parts of the methanolic solution of the copolymer was maintained at 40° C. while continuously stirring it, 13 parts of 1 N methanolic caustic soda solution was added thereto to form solid polymer and the polymer was pulverized, washed and dried to obtain powdery polymer.

The powdery polymer was dissolved in water and viscosity thereof was determined at 30° C. and it was found to be 15 cps at a solid content of 4%. In addition, the degree of saponification of the powder was 94 mol %.

REFERENCE EXAMPLE 3

Synthesis of Water-Soluble Polymer

There were introduced 1,000 parts of vinyl propionate and 25 parts of allyl acetate into a flask similar to that used in Reference Example 1, the air in the system was replaced with $N_2$ gas and then temperature of the system was raised to 60° C. To the system there was added 10 parts of 2,2'-azobisisobutyronitrile in 300 parts of methanol to initiate polymerization of the monomers. After the initiation of the polymerization, 225 parts of allyl acetate wa dropwise added to the system at a constant rate over 5 hours and the polymerization was stopped after the lapse of additional one hour. At this stage, the content of solid material in the system was 48%. Unreacted vinyl propionate and allyl acetate were forced out in the same procedure as in Reference Example 1 to obtain 47% methanol solution of the resultant copolymer. It was confirmed by the same quantitative analysis as in Reference Example 1 that the resultant copolymer comprised 7 mol % of allyl acetate moiety and 93 mol % of vinyl propionate moiety.

As in Reference Example 1, 100 parts of the methanolic solution of the copolymer wa maintained at 40° C. while continuously stirring it, 13 parts of 1 N methanolic caustic soda solution was added thereto to form solid polymer and the polymer was pulverized, washed and dried to obtain powdery polymer.

The powdery polymer was dissolved in water and viscosity thereof was determined at 30° C. and it was found to be 10 cps at a solid content of 4%. In addition, the degree of saponification of the powder was 96 mol %.

EXAMPLE 1

The powdery polymer obtained in Reference Example 1 was dissolved in water to prepare 10% aqueous solution thereof.

This aqueous solution was casted on a horizontal polyester plate having a smooth surface utilizing an applicator and then was dried in an oven to obtain a transparent uniform film having a thickness of 28 microns.

A bag of 5×5 cm in size was made from the resultant film. 20 g of a detergent for washing (manufactured and sold by Kao Corporation under the trade name of ZABU) was charged into the bag and it was sealed by heating. In addition, sodium carbonate powder, ammonium sulfate powder and a herbicide (manufactured and sold by KUMIAI CHEMICAL INDUSTRy CO., LTD. under the trade name of KITAZINE P) were also packed in such bags and sealed respectively. These packages were stored for one year during which a film having a size of 1×1 cm was cut from each sample after the lapse of 6 months and one year and was immersed in water at 20° C. to determine the time required for complete dissolution thereof (time requirement for dissolution of film). The results obtained are summarized in Table 1 given below. As seen from the results listed in Table 1, no change in solubility of the film with time was observed and excellent solubility in cold water thereof was held in all the samples examined.

EXAMPLE 2

The same procedures as in Example 1 were repeated except for using the powdery polymer prepared in Reference Example 2 in place of that obtained in Reference Example 1 and thus the change in water-solubility of the film with time due to the influence of the packaged detergents and chemicals was determined. The results thus obtained are summarized in Table 1 below. In this case, the thickness of the film was 27 microns. As seen from the results listed in Table 1, each film substantially retained its excellent solubility in cold water although the change thereof with time was larger than those observed in Example 1, with respect to all the detergents and chemicals examined.

EXAMPLE 3

The powdery polymer prepared in Reference Example 2 and 10% of glycerin were dissolved in water to form 12% aqueous solution of the polymer. Using this solution, films were produced and the change in cold water solubility thereof with time due to the coexistence of various agents was determined according in the same manner as in Example 1. The results observed are listed in Table 1. In this Example, the thickness of the film was 32 microns.

As seen from the results listed in Table 1, the films exhibited only a small change in the solubility in cold water with time even under the influence of any coexisting detergents and chemicals examined.

COMPARATIVE EXAMPLE 1

Films were prepared according in the same manner as in Example 1 except for using, in place of the powdery polymer obtained in Reference Example 1, PVA having a degree of saponification of 88 mol % and a viscosity of 7 pcs (determined at 30° C., 4% aqueous solution) and likewise the change, with time, in cold water-solubility of the films due to the influence of various agents was determined. The results observed are summarized in Table 1. In this Comparative Example 1, the thickness of the films were 28 microns. As seen from the results listed in Table 1, the solubility of the films in cold water was greatly influenced by the detergents and chemicals examined.

COMPARATIVE EXAMPLE 2

Films were prepared according in the same manner as in Example 1 except for using, in place of the powdery polymer obtained in Reference Example 1, a modified PVA containing 1.5 mol % of maleic acid moiety, having a degree of saponification of 96 mol % and a viscosity of 10 cps (determined at 30° C., 4% aqueous solution) and likewise the change, with time, in cold water-solubility of the films due to the influence of various detergents and chemicals was determined. The results observed are summarized in Table 1. In this Comparative Example 2, the thickness of the films were 28 microns.

As seen from the results listed in Table 1, it was found that the films in this Comparative Example was easily soluble in cold water when the detergents and chemicals were alkaline materials, but they became hardly soluble in cold water when they were brought into contact with acidic materials.

COMPARATIVE EXAMPLE 3

Films were prepared according in the same manner as in Example 3 except for using, in place of the powdery polymer obtained in Reference Example 2, PVA having a degree of saponification of 93 mol % and a viscosity of 16 cps (determined at 30° C., 4% aqueous solution) and likewise the change, with time, in cold water-solubility of the films due to the influence of various detergents and chemicals was determined. The results observed are summarized in Table 1. In this Comparative Example 1, the thickness of the films were 28 microns. As seen from the results listed in Table 1, the solubility of the films in cold water was greatly influenced by all the detergents and chemicals examined.

EXAMPLE 4

According in the same procedures as in Example 1, films were prepared from the powdery polymer obtained in Reference Example 3 and the change in the solubility of the films in cold water with time due to the influence of various detergents and chemicals was determined. The results observed are summarized in Table 1 below. In this case, the thickness of the films were 25 microns. As seen from Table 1, it was found that the solubility of the films in cold water was not changed with time under the influence of any detergents and chemicals examined and that they exhibited excellent solubility in cold water.

air in the system was replaced with $N_2$ gas and then the temperature of the system was raised to 60° C. To the system there was added 10 parts of 2,2'-azobisisobutyronitrile in 300 parts of methanol to initiate polymerization of the monomers. After the initiation of the polymerization, 125 parts of allyl acetate was dropwise added to the system at a constant rate over 5 hours and the polymerization was stopped after the lapse of additional one hour. At this stage, the content of solid material in the system was 45% and the overall yield of polymer with respect to the total amount of the monomers was thus 55%. Unreacted vinyl acetate and allyl acetate were evaporated off under a reduced pressure introducing methanol vapour to obtain 40% methanol solution of the resultant copolymer. It was determined that the resultant copolymer comprised 10.1 mol % of allyl acetate moiety, 89 mol % of vinyl acetate moiety and 0.9 mol % maleic anhydride moiety by quantitatively analyzing the amount of the unreacted allyl acetate, vinyl acetate and maleic anhydride.

100 Parts of the methanol solution of the copolymer was maintained at 40° C. while continuously stirring, 15 parts of 1 N methanolic caustic soda solution was added thereto and stirred sufficiently and thereafter the resulting solution was allowed to stand. After 30 minutes, the solidified polymer was pulverized with a pulverizer, washed with methanol and then dried to obtain powdery polymer.

The powdery polymer was dissolved in water and viscosity thereof was determined at 30° C. and it was found to be 10 cps at a solid content of 4%. In addition, the degree of saponification of the powder was 98 mol %.

REFERENCE EXAMPLE 5

Synthesis of Water-Soluble Polymer

There were introduced 1,000 parts of vinyl acetate

TABLE 1

| Ex. No. | Storage Time | Time Requirement for Dissolution of Films | | | |
|---|---|---|---|---|---|
| | | Detergent | Sodium Carbonate | Ammonium Sulfate | Herbicide |
| 1 | 0 | 10 (sec.) | 10 (sec.) | 10 (sec.) | 10 (sec.) |
| | 6 months | 11 | 10 | 9 | 10 |
| | 12 months | 9 | 9 | 9 | 11 |
| 2 | 0 | 30 | 30 | 30 | 30 |
| | 6 months | 35 | 36 | 29 | 28 |
| | 12 months | 40 | 42 | 31 | 29 |
| 3 | 0 | 22 | 22 | 22 | 22 |
| | 6 months | 25 | 24 | 24 | 21 |
| | 12 months | 30 | 28 | 23 | 23 |
| 1(*) | 0 | 15 | 15 | 15 | 15 |
| | 6 months | 100 | 120 | 40 | 38 |
| | 12 months | insoluble | insoluble | 90 | 85 |
| 2(*) | 0 | 10 | 10 | 10 | 10 |
| | 6 months | 11 | 12 | 80 | 70 |
| | 12 months | 12 | 13 | insoluble | insoluble |
| 3(*) | 0 | 25 | 25 | 25 | 25 |
| | 6 months | 130 | 150 | 35 | 38 |
| | 12 months | insoluble | insoluble | 140 | 110 |
| 4 | 0 | 8 | 9 | 10 | 8 |
| | 6 months | 9 | 10 | 8 | 9 |
| | 12 months | 9 | 9 | 10 | 10 |

(*)Comparative examples

REFERENCE EXAMPLE 4

Synthesis of Water-Soluble Polymer

There were introduced 1,000 parts of vinyl acetate, 25 parts of allyl acetate and 15 parts of maleic anhydride into a flask provided with a stirring machine, a thermometer, a dropping funnel and a reflux condenser, the and 50 parts of allyl acetate into a flask similar to that used in Reference Example 1 and the air in the system was replaced with $N_2$ gas and then the temperature of the system was raised to 60° C. To the system there was added 5 parts of 2,2'-azobisisobutyro-nitrile in 260 parts of methanol to initiate polymerization of the monomers.

After the initiation of the polymerization, 250 parts of allyl acetate was dropwise added to the system at a constant rate over 3 hours. The polymerization was stopped 5 hours after the initiation of the polymerization. At this stage, the content of solid material in the system was 52%. Then, unreacted allyl acetate and vinyl acetate were forced out according in the same manner as in Reference Example 1 to obtain 48% methanolic solution of the resultant copolymer. It was confirmed by the same quantitative analysis as in Reference Example 1 that the resultant copolymer comprised 18.8 mol % of allyl acetate moiety, 79.3 mol % of vinyl acetate moiety and 1.9 mol % of itaconic acid anhydride moiety.

As in Reference Example 1, 100 parts of the methanolic solution of the copolymer was maintained at 40° C. while continuously stirring it, 13 parts of 1 N methanolic caustic soda solution was added thereto to form solid polymer and the polymer was pulverized, washed and dried to obtain powdery polymer.

The powdery polymer was dissolved in water and viscosity thereof was determined at 30° C. and it was found to be 15 cps at a solid content of 4%. In addition, the degree of saponification of the powder was 94 mol %.

REFERENCE EXAMPLE 6

Synthesis of Water-Soluble Polymer

There were introduced 1,000 parts of vinyl propionate, 25 parts of allyl acetate and 40 parts of maleic anhydride into a flask similar to that used in Reference Example 1, the air in the system was replaced with $N_2$ gas and then temperature of the system was raised to 60° C. To the system there was added 10 parts of 2,2'-azobisisobutyronitrile in 300 parts of methanol to initiate polymerization of the monomers. After the initiation of the polymerization, 100 parts of allyl acetate was dropwise added to the system at a constant rate over 5 hours and the polymerization was stopped after the lapse of additional one hour. At this stage, the content of solid material in the system was 45%. Unreacted vinyl propionate and allyl acetate were forced out in the same procedure as in Reference Example 1 to obtain 43% methanol solution of the resultant copolymer. It was confirmed by the same quantitative analysis as in Reference Example 1 that the resultant copolymer comprised 8.6 mol % of allyl acetate moiety, 88.3 mol % of vinyl propionate moiety and 3 mol % of maleic anhydride moiety.

As in Reference Example 1, 100 parts of the methanolic solution of the copolymer was maintained at 40° C. while continuously stirring it, 13 parts of 1 N methanolic caustic soda solution was added thereto to form solid polymer and the polymer was pulverized washed and dried to obtain powdery polymer.

The powdery polymer was dissolved in water and viscosity thereof was determined at 30° C. and it was found to be 13 cps at a solid content of 4%. In addition, the degree of saponification of the powder was 96 mol %.

EXAMPLE 5

The powdery polymer obtained in Reference Example 4 was dissolved in water to prepare 10% aqueous solution thereof.

This aqueous solution was casted on a horizontal polyester plate having a smooth surface utilizing an applicator and then was dried in an oven to obtain a transparent uniform film having a thickness of 28 microns.

A bag of 5×5 cm in size was made from the resultant film. 20 g of a detergent for washing (manufactured and sold by Kao Corporation under the trade name of ZABU) was charged into the bag and it was sealed by heating. In addition, sodium carbonate powder, ammonium sulfate powder and a herbicide (manufactured and sold by KUMIAI CHEMICAL INDUSTRy CO., LTD. under the trade name of KITAZINE P) were also packed in such bags and sealed respectively. These packages were stored for one year during which a film having a size of 1×1 cm was cut from each sample after the lapse of 6 months and one year and was immersed in water at 20° C. to determine the time required for complete dissolution thereof (time requirement for dissolution of film). The results obtained are summarized in Table 2 given below. As seen from the results listed in Table 2, no change in solubility of the film with time was observed and excellent solubility in cold water thereof was held in all the samples examined.

EXAMPLE 6

The same procedures as in Example 5 were repeated except for using the powdery polymer prepared in Reference Example 2 in place of that obtained in Reference Example 5 and thus the change in water-solubility of the film with time due to the influence of the packaged detergents and chemicals was determined. The results thus obtained are summarized in Table 1 below. In this case, the thickness of the film was 27 microns. As seen from the results listed in Table 1, each film substantially retained its excellent solubility in cold water although the change thereof with time was larger than those observed in Example 5, with respect to all the detergents and chemicals examined.

EXAMPLE 7

The powdery polymer prepared in Reference Example 5 and 10% of glycerin were dissolved in water to form 12% aqueou solution of the polymer. Using this solution, films were produced and the change in cold water solubility thereof with time due to the coexistence of various agents was determined according in the same manner as in Example 5. The results observed are listed in Table 2. In this Example, the thickness of the film was 32 microns.

As seen from the results listed in Table 2, the films exhibited only a small change in the solubility in cold water with time even under the influence of any coexisting detergents and chemicals examined.

EXAMPLE 8

According in the same procedures as in Example 5, films were prepared from the powdery polymer obtained in Reference Example 6 and the change in the solubility of the films in cold water with time due to the influence of various pharmaceutical agents and chemicals was determined. The results observed are summarized in Table 2 below. In this case, the thickness of the films were 25 microns. As seen from Table 2, it was found that the solubility of the films in cold water was not changed with time under the influence of any detergents and chemicals examined and that they exhibited excellent solubility in cold water.

TABLE 2

| Ex. No. | Storage Time | Time Requirement for Dissolution of Films | | | |
|---|---|---|---|---|---|
| | | Detergent | Sodium Carbonate | Ammonium Sulfate | Herbicide |
| 5 | 0 | 9 (sec.) | 9 (sec.) | 9 (sec.) | 9 (sec.) |
| | 6 months | 10 | 9 | 8 | 9 |
| | 12 months | 8 | 7 | 8 | 10 |
| 6 | 0 | 27 | 25 | 28 | 26 |
| | 6 months | 30 | 28 | 28 | 24 |
| | 12 months | 33 | 35 | 30 | 27 |
| 7 | 0 | 20 | 21 | 19 | 17 |
| | 6 months | 23 | 22 | 22 | 20 |
| | 12 months | 28 | 25 | 22 | 21 |
| 8 | 0 | 7 | 7 | 8 | 7 |
| | 6 months | 8 | 8 | 8 | 8 |
| | 12 months | 8 | 8 | 9 | 8 |

What is claimed is:

1. A film easily soluble in cold water, comprising a water-soluble copolymer comprising:
   2 to 40 mol % allyl ester moieties;
   97.5 to 50 mol % vinyl ester moieties; and
   0.5 to 10 mol % of at least one member selected from the group consisting of unsaturated monocarboxylic acid, unsaturated dicarboxylic acid and anhydrides thereof;
   wherein said copolymer has a degree of saponification of not less than 65 mol %.

2. The film of claim 1, wherein the allyl ester is at least one member selected from the group consisting of allyl formate, allyl acetate, allyl butyrate, allyl caproate and allyl maleate.

3. The film of claim 1, wherein the vinyl ester moiety is at least one member selected form the group consisting of vinyl formate, vinyl acetate, vinyl propionate, vinyl butyrate and vinyl laurate.

4. The film of claim 1, wherein the unsaturated monocarboxylic acid is at least one other monomer moiety selected form the group consisting of crotonic acid and (meth)acrylic acid.

5. The film of claim 1, wherein the unsaturated dicarboxylic acid is at least one other monomer moiety selected from the group consisting of maleic acid, itaconic acid, fumaric acid and anhydrides thereof.

6. The film of claim 1, further comprising at least one plasticizer for the water-soluble copolymer selected from the group consisting of glycerin, diethylene glycol, triethylene glycol, polyethylene glycol, polyglycerol, tetraethylene glycol, triethanolamine, 1,3-butanediol, triethanolamine acetate and ethanol acetamide.

7. The film of claim 1, further comprising at least one member selected from the group consisting of polyvinyl chloride, starches, cellulose derivatives, polyacrylic acid and alkali metal salts thereof, and pigments.

8. The film of claim 1, further comprising:
   at least one plasticizer for the water-soluble copolymer selected from the group consisting of glycerin, diethylene glycol, triethylene glycol, polyethylene glycol, polyglycerol, tetraethylene glycol, triethanolamine, 1,3-butanediol, triethanolamine acetate and ethanol acetamide; and
   at least one member selected from the group consisting of polyvinyl chloride, starches, cellulose derivatives, polyacrylic acid and alkali metal salts thereof, and pigments.

* * * * *